(12) United States Patent
Brun et al.

(10) Patent No.: US 12,560,212 B2
(45) Date of Patent: Feb. 24, 2026

(54) DEVICE FOR DISCONNECTING AND BRAKING A ROTOR OF AN ELECTRIC MACHINE

(71) Applicants: Safran Aircraft Engines, Paris (FR); Safran Landing Systems, Velizy-Villacoublay (FR)

(72) Inventors: Didier Brun, Moissy-Cramayel (FR); Huguette De Wergifosse, Moissy-Cramayel (FR); Gilles Eluard, Moissy-Cramayel (FR)

(73) Assignees: Safran Aircraft Engines, Paris (FR); Safran Landing Systems, Velizy-Villacoublay (FR)

( * ) Notice: Subject to any disclaimer, the term of this patent is extended or adjusted under 35 U.S.C. 154(b) by 489 days.

(21) Appl. No.: 18/102,409

(22) Filed: Jan. 27, 2023

(65) Prior Publication Data

US 2023/0250857 A1     Aug. 10, 2023

(30) Foreign Application Priority Data

Feb. 4, 2022    (FR) ...................................... 2200987

(51) Int. Cl.
| | |
|---|---|
| *F16D 65/18* | (2006.01) |
| *F16D 121/18* | (2012.01) |
| *F16D 125/36* | (2012.01) |
| *F16D 125/40* | (2012.01) |

(52) U.S. Cl.
CPC .......... *F16D 65/18* (2013.01); *F16D 2121/18* (2013.01); *F16D 2125/36* (2013.01); *F16D 2125/40* (2013.01)

(58) Field of Classification Search
CPC .... F16D 11/04; F16D 23/12–2023/123; F16D 65/18; F16D 67/00–06; F16D 2121/18; F16D 2125/36; F16D 2125/40
See application file for complete search history.

(56) References Cited

U.S. PATENT DOCUMENTS

| | | | |
|---|---|---|---|
| 3,750,781 | A | 8/1973 | Lengsfeld |
| 2009/0056498 | A1* | 3/2009 | Birdi ....................... F16D 11/04 |
| | | | 74/840 |
| 2018/0023635 | A1* | 1/2018 | Neelakantan ......... F16D 25/061 |
| | | | 475/149 |
| 2023/0039164 | A1* | 2/2023 | Finke ...................... F16D 23/12 |

FOREIGN PATENT DOCUMENTS

| | | |
|---|---|---|
| FR | 2405586 A1 | 5/1979 |
| GB | 2525019 A | 10/2015 |

OTHER PUBLICATIONS

France Patent Application No. 2200987, Search Report, dated Dec. 12, 2022.

* cited by examiner

*Primary Examiner* — David R Morris
(74) *Attorney, Agent, or Firm* — Kilpatrick Townsend & Stockton LLP

(57)     ABSTRACT
This device for disconnecting and braking a rotor of an electric machine comprises an inner axis driven in rotation by the rotor and longitudinally movable between an engagement position and a disconnection position, the disconnection and braking device further comprising a longitudinally fixed nut and a mechanism or system for braking the rotation of the nut so that braking of the rotation of the nut urges the inner axis into its disconnection position and brakes the rotation of the rotor.

9 Claims, 3 Drawing Sheets

[Fig 1]

[Fig 2]
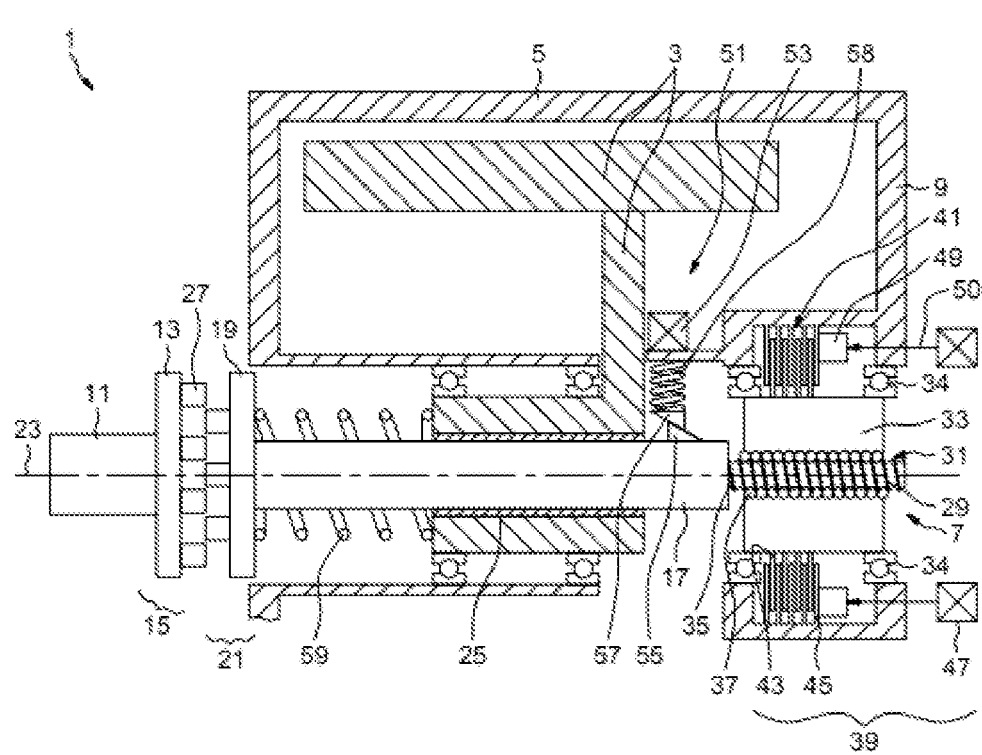

[Fig 3]
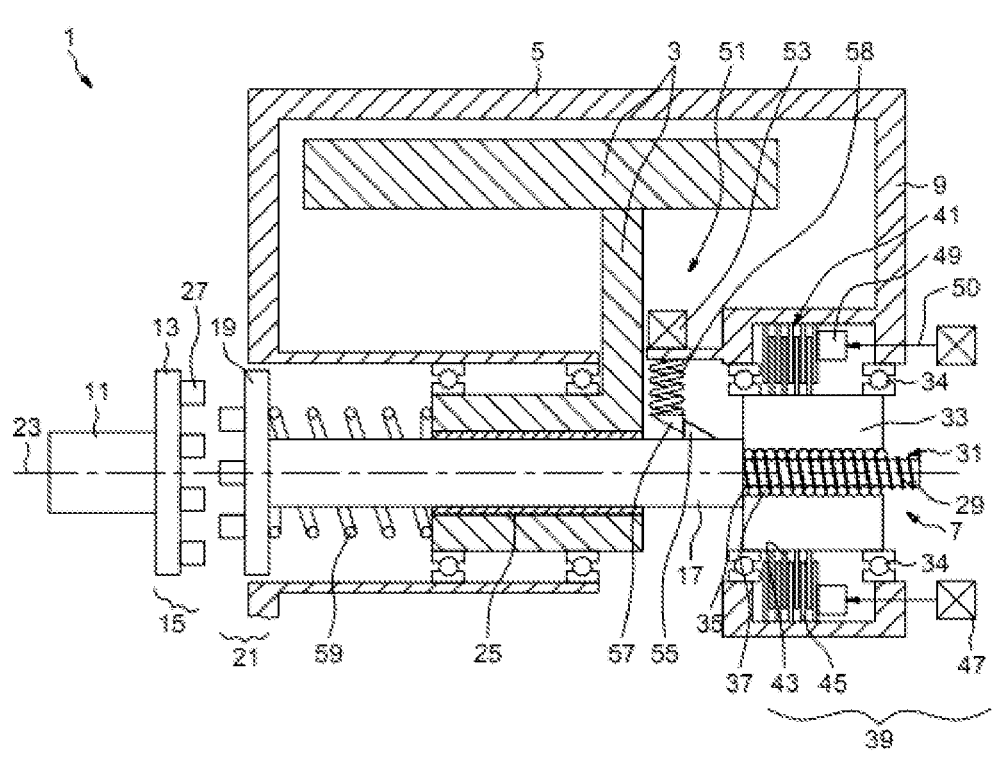
[Fig 4]
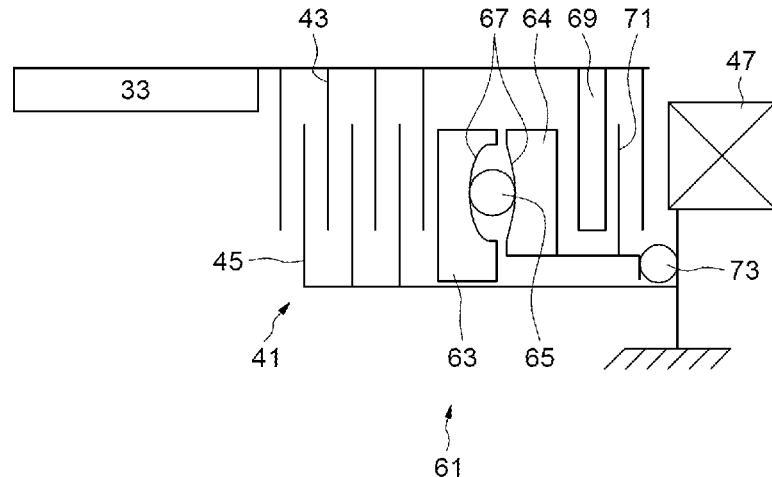

DEVICE FOR DISCONNECTING AND BRAKING A ROTOR OF AN ELECTRIC MACHINE

CROSS REFERENCE TO RELATED APPLICATIONS

This application is related to and claims priority benefits of France Patent Application No. 2200987 ("the '987 application"), filed on Feb. 4, 2022. The '987 application is hereby incorporated in its entirety by this reference.

TECHNICAL FIELD

The present invention relates to electric machines. In particular, the present invention relates to disconnection and stoppage of the rotation of the rotor of a permanent-magnet electric machine.

In general, the invention applies to all types of electric machines requiring a disconnection of the kinematic chain and stoppage of the rotation of their rotor.

PRIOR ART

An aircraft, for example an airplane, needs to perform movements on the ground besides the take-off and landing phases. For example, these consist of taxiing, forward or backward tracking type movements.

Historically, movements on the ground, and in particular backward tracking, use the thrust of the main engines of the aircraft and/or a runway tractor towing or pushing the aircraft.

Many systems comprising electromechanical actuators at the landing gears are nowadays installed so that the aircraft could move in a standalone manner on the ground. Given the power required to set an aircraft in movement, the electro-mechanical actuators comprise a permanent-magnet electric machine.

However, in the event of a short-circuit on this electric machine type, for example on power supply cables, the generated electric arc remains sustained until stoppage of the rotation of the rotor of the electric machine. Said electric machine being powerful, this electric arc could deteriorate the cables and the structure of the landing gear.

In the event of a failure such as a short-circuit detected by a dedicated and appropriate monitoring system, it is necessary to cut off the electric arc, by opening the electric circuit the closest to the electric machine and/or by stopping the rotation of the rotor of the electric machine.

Some devices of the prior art allow inserting an outer member in the kinematic chain linked to the rotor and thus breaking up a breakable element of said kinematic chain in order to isolate the rotor and avoid rotation thereof with the inertia of the aircraft. However, this solution does not guarantee blockage of the rotation of the rotor of the electric machine if the latter remains rotating by its inertia after break-up of the breakable element. In addition, the actuator requires a human intervention as well as a replacement of a mechanical part to recover the kinematic chain in its operation.

There are other non-destructive devices but they only allow detaching the rotor without stopping rotation thereof which subsists depending on the inertia of the rotor.

DISCLOSURE OF THE INVENTION

Hence, the present invention aims to overcome the afore-mentioned drawbacks and provide a device enabling the disconnection of the rotor and the stoppage of the rotation of the rotor and that being so in a non-destructive manner in order to be testable and to be able to be reset in service without any external human intervention or replacement of a mechanical component.

An object of the present invention is a device for discon-necting and braking a rotor of an electric machine, the device comprising an outer shaft comprising a first coupling system located at one end of the outer shaft, and an inner axis comprising a second coupling system located at a first end of the inner axis and a tapping at a second end of the inner axis, the inner axis being driven in rotation by the rotor and longitudinally movable between an engagement posi-tion in which the second coupling system is coupled with the first coupling system and a disconnection position in which the second coupling system is not coupled with the first coupling system, the disconnection and braking device further comprising a nut longitudinally fixed around the second end and threaded so as to cooperate with the tapping of the second end of the inner axis, and a means for braking the rotation of the nut so that braking of the rotation of the nut urges the inner axis into its disconnection position and brakes the rotation of the rotor.

Thus, the means for braking the rotation of the nut allows, in one single braking action and in a reversible and non-destructive manner, disconnecting the electric machine off the outer shaft connected to the rest of the kinematic chain, as well as stopping the rotation of the rotor in order to avoid sustaining an electric arc in the case of a short-circuit.

In addition, the device is symmetrical around the axis of rotation of the rotor, thereby generating no disturbances related to parasitic masses.

Advantageously, the disconnection and braking device comprises a means for locking the inner axis in the discon-nection position.

In one embodiment, the means for locking the inner axis in the disconnection position comprises a system of mechanical stops for automatic locking and an unlocking control solenoid.

Advantageously, the disconnection and braking device comprises a means for applying a longitudinal force for holding the inner axis in the engagement position.

In one embodiment, the means for applying a longitudinal force for holding the inner axis in the engagement position comprises a spring positioned in contact with the second coupling means on the one hand and with the rotor on the other hand.

In one embodiment, the tapping of the second end of the inner axis comprises a raceway and balls so as to make a ball screw.

Advantageously, the means for braking the rotation of the nut comprises a multi-disk brake comprising a set of disks linked to the nut and a set of disks linked to a casing of the electric machine.

According to one embodiment, the means for braking the rotation of the nut comprises a control solenoid and a magnetic element, so that the passage of a current in the control solenoid generates a longitudinal force on the mag-netic element so as to apply a pressing force on the multi-disk brake.

Furthermore, the means for braking the rotation of the nut may advantageously comprise a ball ramp system for the amplification of the pressing force. Another object of the present invention is an aircraft comprising a device as defined before.

BRIEF DESCRIPTION OF THE DRAWINGS

Other aims, features and advantages of the invention will appear upon reading the following description, given solely as a non-limiting example, and made with reference to the appended drawings wherein:

FIG. 1 is a sectional view of an electric machine comprising a rotor and a device for disconnecting and braking the rotor according to the invention in an engagement position;

FIG. 2 is a sectional view of the electric machine illustrated in FIG. 1 in an intermediate position;

FIG. 3 is a sectional view of the electric machine illustrated in FIG. 1 in a disconnection position; and FIG. 4 is a schematic view of a ball ramp system for the amplification of a pressing force for braking the rotor.

DETAILED DESCRIPTION OF AT LEAST ONE EMBODIMENT

Figure 1:
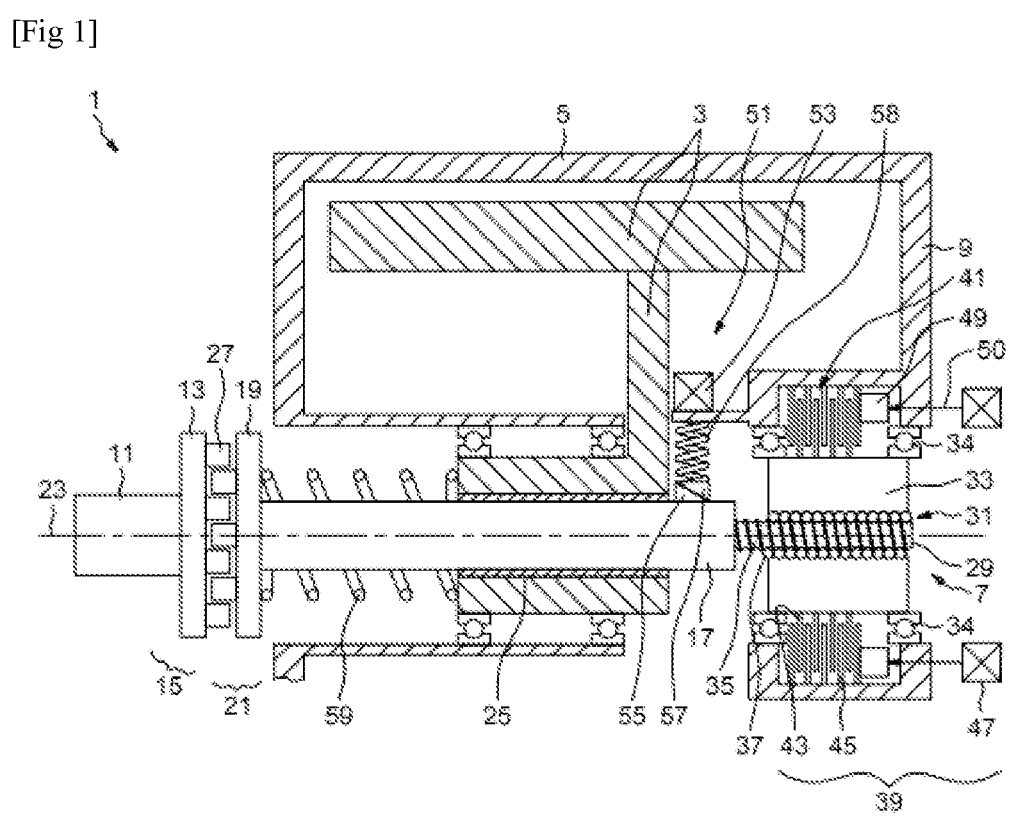

In FIG. 1, a sectional view of an electric machine 1 is schematically represented comprising a rotor 3, a stator 5 and a device 7 for disconnecting and braking the rotor 3. In particular, the stator 5 may be linked to a casing 9 of the electric machine 1, the casing corresponding to a fixed reference frame hereafter. For example, the electric machine 1 is a permanent-magnet electric machine for rotating the wheels of an aircraft during movements on the ground excluding take-off and landing. For example, these movements comprise taxiing of the aircraft.

The disconnection and braking device 7 comprises an outer shaft 11 comprising a first coupling system 13 located at one end 15 of the outer shaft 11. In particular, the outer shaft 11 is for example linked at its other end (not represented) to the gearbox joining the wheels of the aircraft.

The disconnection and braking device 7 also comprises an inner axis 17 comprising a second coupling system 19 located at a first end 21 of the inner axis 17. For example, the inner axis 17 is aligned on the longitudinal axis 23 of the electric machine 1, in other words on the axis of rotation of the rotor 3 of the electric machine 1.

The inner axis 17 comprises a sliding connection 25 with the rotor 3, the sliding connection 25 comprising longitudinal grooves along its surface of the inner axis 17 so that the inner axis 17 could be driven in rotation by the rotor 3 while being movable longitudinally between an engagement position illustrated in FIG. 1 in which the second coupling system 19 is coupled with the first coupling system 13 and a disconnection position illustrated in FIG. 3 in which the second coupling system 19 is not coupled with the first coupling system 13. An intermediate position is illustrated in FIG. 2.

For example, each of the first and second coupling systems 13 and 19 comprises teeth 27 forming a front gearing, or claw clutch. The teeth 27 of the first and second coupling systems 13 and 19 are intended to be positioned between one another in the engagement position so as to secure the inner axis 17 with the outer shaft 11. Thus, the rotating inner axis 17 transmits its rotation to the outer shaft 11 in the engagement position and transmits no rotation in the disconnection position.

The inner axis 17 further comprises a tapping 29 positioned over the second end 31 of the inner axis 17.

The disconnection and braking device 7 also comprises a nut 33 longitudinally fixed and fitted around a tapping 29. For this purpose, the nut 33 is threaded so as to cooperate with said tapping 29. In order to keep the nut 33 longitudinally fixed and enable rotation thereof, the disconnection and braking device 7 comprises bearings 34, for example ball or roller bearings, on which the nut 33 is mounted in order to block it longitudinally. For example, these consist of tapered roller bearings.

In the embodiment of FIG. 1, the tapping 29 of the second end 31 of the inner axis 17 comprises a raceway 35 in the form of a groove and balls 37 capable of circulating in the raceway 35 so as to make a ball screw. The threaded nut 33 also comprises a raceway intended to accommodate the balls. This ball screw connection type allows limiting frictions and therefore limiting losses due to this connection. However, the tapping 29 may also be of another kind, for example a screw-nut conventional tapping.

The disconnection and braking device 7 also comprises a means 39 for braking the rotation of the nut 33. Thus, when the braking means 39 is inactive, in other words when it does not brake the rotation of the nut 33, the nut 33 is freely rotatable and is driven by the rotation of the inner axis 17, in particular if the latter is in the engagement position. Conversely, when the braking means 39 is active, in other words when it brakes the rotation of the nut 33, and the rotor 3 drives the inner axis 17 in rotation, the nut 33 is no longer freely rotatable and the second end 31 of the inner axis 17 moves longitudinally because of the oblique tapping 29 and the rotational inertia of the inner axis 17, urging the inner axis 17 into its disconnection position. The interest of using a ball screw between the nut 33 and the inner axis 17 is the reduction of the torque for taking up the tangential force of the nut 33 on the inner axis 17 when the nut 33 is blocked. Indeed, the take-up torque results from the angle of the helix of the tapping and especially the low friction coefficient of the balls 37 rolling in the raceway 35. In addition, the connection between the nut 33 and the inner axis 17 is made reversible for switching from a rotation into a translation or conversely from a translation into a rotation.

Once the inner axis 17 is in the disconnection position, it abuts against the nut 33 and no longer moves longitudinally. The means 39 for braking the rotation of the nut 33 then contributes to braking of the residual rotation of the rotor 3 through the inner axis 17. Braking is performed within a period of time in the range of a few ten seconds, preferably within a period of time in the range of a tenth of a second.

For example, the braking means 39 is activated after detection of a fault, for example a short-circuit in the cables of the electric machine 1 or more generally in the power harness, detected by a dedicated detector system.

For example, the means 39 for braking the rotation of the nut 33 comprises a multi-disk brake 41 comprising a first set of disks 43 linked to the nut 33, for example by inner splines (not represented), and a second set of disks 45 linked to the casing 9 of the electric machine 1, for example by outer splines (not represented). Hence, the first set of disks 43 rotates with the nut 33 whereas the second set of disks 45 is fixed. The multi-disk brake 41 allows dissipating a large amount of energy in a reduced volume, which is the case proximate to the electric machine 1, the device being for example embedded on an aircraft.

In order to control the activation and deactivation of the braking means 39, the means 39 for braking the rotation of the nut 33 comprises a control solenoid 47 and a magnetic element 49. The magnetic element 49 is an element applying a pressing force on the multi-disk brake 41 when the braking means 39 is activated. In particular, if a current is fed in the control solenoid 47, in other words when the braking means 39 is activated, the control solenoid 47, in turn, generates a longitudinal magnetic field 50 which sets the magnetic element 49 in movement so as to apply the pressing force. The sets of disks 43 and 45 being thus compressed, braking begins.

In the embodiment illustrated in FIGS. 1 to 3, the disconnection and braking device 7 further comprises a means 51 for locking the inner axis 17 in the disconnection position.

For example, the locking means 51 comprises an unlocking control solenoid 53 and a system of mechanical stops comprising for example a first stop 55 positioned on the inner axis and a second stop 57 positioned radially at the same level as the first stop 55. For example, the second stop 57 is fastened at the end of a spring 58, itself fastened to the casing 9 so that the second stop 57 is movable radially. For example, the first and second stops are annular. Each stop 55 and 57 is configured so that the contact between the two stops 55 and 57 does not stop the longitudinal movement of the inner axis 17 when the latter switches from the engagement position into the disconnection position. In particular, the second stop 57 can move radially so as to let the first stop 55 passes longitudinally with the movement of the inner axis 17. However, each stop 55 and 57 is configured so that the contact between the two stops 55 and 57 stops the longitudinal movement of the inner axis 17 when the latter is in the disconnection position. Hence, the inner axis 17 cannot returns back to the engagement position.

Thus, when the inner axis 17 switches from the engagement position into the disconnection position, the locking means 51 is automatically and mechanically locked thanks to the action of one against another amongst the first and second stops 55 and 57 without any external energy input except the movement of the inner axis 17.

In addition, the locking means 51 may be deactivated using the unlocking control solenoid 53, which is for example a coil in which current can be fed so as to generate a magnetic field and to act, for example on the spring 58 on which the second stop 57 is fastened, to move and/or raise the second stop 57 so as to no longer lock the inner axis 17 in the disconnection position.

The disconnection and braking device 7 further comprises a means 59 for applying a longitudinal force for holding the inner axis 17 in the engagement position. For example, this means 59 comprises a spring positioned in contact with the second coupling system 19 on the one hand and with the rotor 3 on the other hand.

In an example of use of the device 7, and in the rated operating mode, illustrated in FIG. 1, the inner axis 17 is coupled with the outer shaft 11. The nut 33 is then freely rotatable. In particular, the nut 33 rotates with the inner axis 17 whose rotation is initiated by the rotor 3 and/or by the inertia of the wheels of the aircraft on the outer shaft 11. The nut 33 generates no load except a slight drag torque due to frictions in the ball bearings 34 and in the multi-disk brake 41.

In case of detection of a short-circuit, the rotation of the nut 33 is blocked by the activation of the means 39 for braking the rotation of the nut 33 so that the inner axis 17, driven in rotation by the rotor 3 and/or by the inertia of the outer shaft 11, is subjected to a longitudinal movement because of the presence of the oblique tapping 29. The inner axis moves away from the outer shaft 11, as represented in FIG. 2.

After disengagement of the teeth 27 visible in FIG. 2, the inner axis 17 continues its longitudinal axis under the inertia of the rotation of the rotor 3 up to the disconnection position visible in FIG. 3, before being locked by the locking means 51 in the disconnection position in order to prevent a non-controlled inadvertent re-engagement of the inner axis 17. The braking means 39 then brakes the residual rotation of the rotor 3 of the electric machine 1.

For the device 7 to operate properly, after disengagement of the teeth 27, the residual kinetic energy of the rotor 3 of the electric machine 1 should be enough and the braking torque due to the connection of the tapping 29 limited to keep sustaining the rotation of the inner axis 17 up to its disconnection position.

The means 39 for braking the nut 33 is also sized so as to generate a force equivalent to the frictional force of disengagement of coupling of the teeth 27, at the splines of the sliding connection 25 with the rotor 3, to the force of the means 59 for applying a longitudinal force for holding the inner axis 17 in the engagement position, as well as to the frictional force generated by the connection of the tapping 29 itself.

Optionally, and given the torque needed to brake the rotor 3, the braking means 39 may comprise a ball ramp system 61 for the amplification of the pressing force, schematically illustrated in section in FIG. 4. The ball ramp system 61 comprises a pressure plate 63 and a cam 64, substantially circular and coaxially arranged with respect to one another according to the axis 23. The elements 63 and 64 are separated by one or more ball(s) 65 comprising as many pairs of concave surfaces 67 on their faces opposite one another as balls 65. Each of the pairs of concave surfaces 67 comprises a ball 65 between the concave surfaces.

The ball ramp system 61 also comprises a magnetic winding 69 and a control brake 71 as well as a ball stop 73.

The ball ramp system 61 cooperates with an electromagnet, or uses for example a control solenoid 47, which, when it is powered, causes the axial movement of the magnetic winding 69 thereby generating a pressing force on the control brake 71, which causes the rotation of the cam 64 whereas the pressure plate 63 is fixed in rotation. The relative angular movement between both plate and cam then causes a geared-down axial pressing force on the multi-disk brake 41 to control braking of the nut 33.

The invention claimed is:

1. A device for disconnecting and braking a rotor of an electric machine, characterized in that it comprises an outer shaft comprising a first coupling system located at one end of the outer shaft, and an inner axis comprising a second coupling system located at a first end of the inner axis and a tapping at a second end of the inner axis, the inner axis being driven in rotation by the rotor and longitudinally movable between an engagement position in which the second coupling system is coupled with the first coupling system and a disconnection position in which the second coupling system is not coupled with the first coupling system, the disconnection and braking device further comprising a nut longitudinally fixed around the second end and threaded so as to cooperate with the tapping of the second end of the inner axis, and a means for braking the rotation of the nut so that braking of the rotation of the nut urges the inner axis into its disconnection position and brakes the rotation of the rotor, the means for braking the rotation of the nut comprising a multi-disk brake comprising a first set of disks linked to the nut and a second set of disks linked to a casing of the electric machine.

2. The device according to claim 1, further comprising a means for locking the inner axis in the disconnection position.

3. The device according to claim 2, wherein the means for locking the inner axis in the disconnection position comprises a system of mechanical stops for automatic locking and an unlocking control solenoid.

4. The device according to claim 1, comprising a means for applying a longitudinal force for holding the inner axis in the engagement position.

5. The device according to claim 4, wherein the means for applying a longitudinal force for holding the inner axis in the engagement position comprises a spring positioned in contact with the second coupling system and with the rotor.

6. The device according to claim 1, wherein the tapping of the second end of the inner axis comprises a raceway and balls so as to make a ball screw.

7. The device according to claim 1, wherein the means for braking the rotation of the nut comprises a control solenoid and a magnetic element, so that a passage of a current in the control solenoid generates a longitudinal force on the magnetic element so as to apply a pressing force on the multi-disk brake.

8. The device according to claim 7, wherein the means for braking the rotation of the nut comprises a ball ramp system for an amplification of the pressing force.

9. An aircraft characterized in that it comprises a device according to claim 1.

\* \* \* \* \*